May 31, 1927.  W. L. McLAINE ET AL  1,630,444
LUBRICATING STUFFING BOX
Filed Jan. 12, 1924
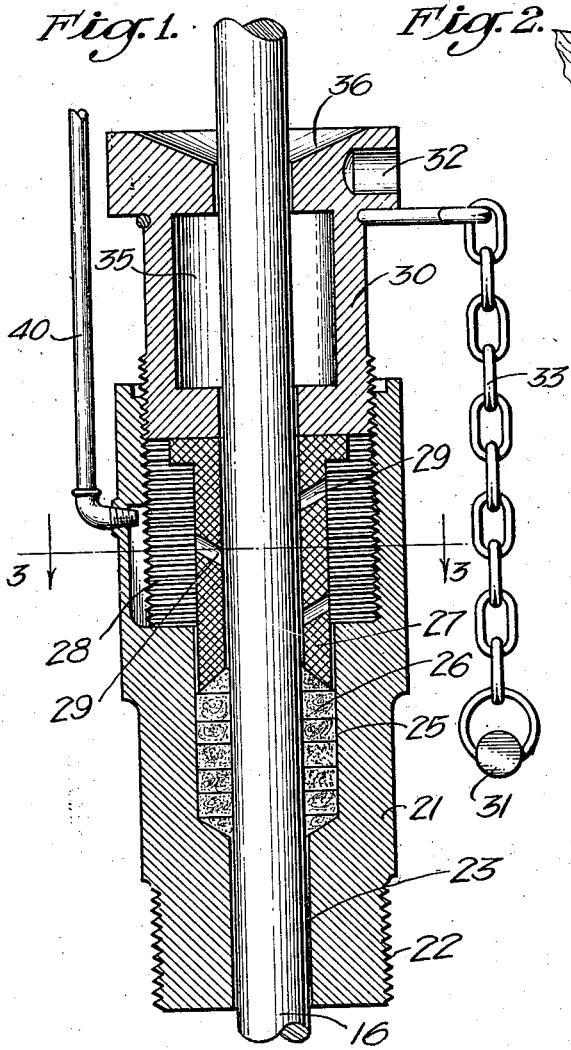
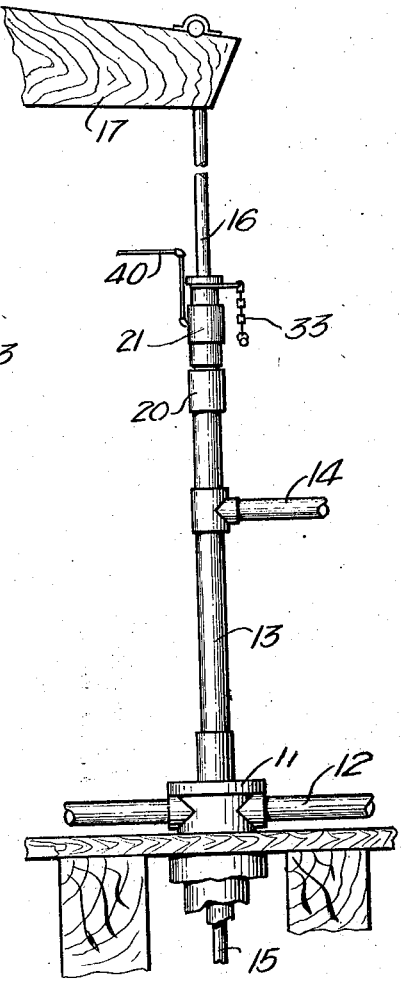
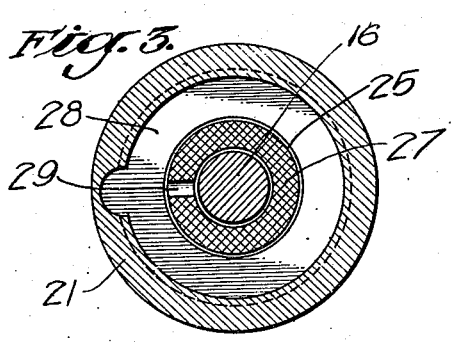
INVENTORS
WILLIAM L. McLAINE,
WILLARD L. BOROUGH,
BY
ATTORNEYS.

Patented May 31, 1927.

1,630,444

UNITED STATES PATENT OFFICE.

WILLIAM L. McLAINE, OF LOS ANGELES, AND WILLARD L. BOROUGH, OF FULLERTON, CALIFORNIA.

LUBRICATING STUFFING BOX.

Application filed January 12, 1924. Serial No. 685,869.

Our invention relates to the art of producing petroleum oils. In this art it is often necessary to pump the oil from the ground. The standard well arrangement where pumping is necessary consists of a tubing, which extends down inside the casing or lining of the well, and a pump suspended in the well on the lower end of said tubing. The pump plunger is then reciprocated through sucker rods, one of which is known as the polish rod. The polish rod is made quite uniform in diameter and highly polished. A stuffing box is then secured on the upper end of the tubing about the polish rod so that the pump pressure may be exerted on the upper end of the tubing to force the oil to tanks or other storage.

It is commonly assumed that stuffing boxes so placed need no lubrication but we have found that lubrication is most essential and our invention resides broadly in applying a lubricated stuffing box to an oil well pump.

Further objects and advantages will be made evident hereinafter.

Referring to the drawing which is for illustrative purposes only,

Fig. 1 is an elevation partly in section of a stuffing box embodying our invention.

Fig. 2 is a diagrammatic elevation of our invention as applied to an oil well.

Fig. 3 is a section on a line represented by the line 3—3 of Fig. 2.

In the form of the invention illustrated, we employ a casing head 11 which is fitted with gas lines 12 and in which tubing 13 is secured. The tubing 13 is provided with a flow line 14, through which the oil is pumped to suitable tanks, not shown. Sucker rods 15 terminate in a polish rod 16 which is reciprocated by a walking beam 17.

Secured in a collar 20 on the tubing 13 is a lubricated stuffing box, shown in detail in Figs. 1 and 3. This stuffing box comprises a body 21 threaded at 22 to fit in the collar 20 and having a central hole 23 through which the polish rod 16 extends. Surrounding the polish rod 16 is a gland cavity 25 in which packing 26 is placed, this packing being compressed by a gland 27. The gland 27 fits into the gland cavity 25 and extends up into an oil chamber 28, formed in the body 21. The gland has holes 29 therethrough.

Threaded inside the oil chamber 28 is a follower 30 which may be turned by a rod 31, which fits into a socket 32, and which is suspended from a chain 33 when not in use. The follower 30 has a central chamber 35 and a conoidal top 36.

Oil under some pressure is supplied to the oil chamber 28 by a pipe 40 from some convenient source, not shown.

The method of operation is as follows:

The polish rod 16, being reciprocated by the beam 17, oil is pumped upwardly inside the tubing 13 but is prevented from escaping therefrom by means of the lubricated stuffing box shown.

Oil, supplied through the pipe 40, partially fills the oil chamber 28 and readily passes through the openings 29 in the gland 27. This gland may be forced downwardly by turning the follower 30 by means of the rod 31. The oil passing through the openings 29 thoroughly lubricates the polish rod and is carried down into the packing 26, thoroughly lubricating this packing.

We find that stuffing boxes operating in oil wells must be lubricated and that the crude oil cannot be depended on for this important function. By proper lubrication the life of the packing 26 can be very greatly prolonged and all leakage of crude oil prevented.

The chamber 35 acts as an auxiliary chamber in which any excess of oil may be stored.

We claim as our invention:

1. A stuffing box for a reciprocating rod comprising: a body providing a lower packing chamber and an upper communicating oil chamber through both of which said rod passes; absorbent packing surrounding said rod within said packing chamber; an axially translatable tubular gland surrounding said rod within said oil chamber and extending into said packing chamber to engage said packing, said gland having a perforate wall permitting free passage of oil from said oil chamber to the rod and having a bore of greater diameter than that of the rod to permit unrestricted passage of oil directly to said packing; and a follower surrounding the rod and forming a closure for said oil chamber and adapted for translation to force said gland against said packing, said follower providing an auxiliary chamber to receive excess oil.

2. A stuffing box for a reciprocating rod comprising: a body providing a lower packing chamber and an upper communicating oil chamber through both of which said rod passes; absorbent packing surrounding said rod within said packing chamber; an axially translatable tubular gland surrounding said rod within said oil chamber and extending into said packing chamber to engage said packing, said gland having a perforate wall permitting free passage of oil from said oil chamber to the rod and having a bore of greater diameter than that of the rod to permit unrestricted passage of oil directly to said packing; and a follower surrounding the rod and forming a closure for said oil chamber, said follower being screwed into said oil chamber and being adapted for translation to force said gland against said packing.

3. A stuffing box for a reciprocating rod comprising: a body providing a reciprocating rod bore, a packing chamber formed by a counterbore therefrom, and a lubricant chamber formed by a counterbore from said packing chamber, said rod passing axially through said bore and counterbores; absorbent packing surrounding said rod in said packing chamber; an axially translated tubular gland surrounding said rod within said oil chamber and extending into said packing chamber to engage said packing, said gland having a perforate wall permitting free passage of oil from said oil chamber to the rod and having a bore of sufficiently greater diameter than said rod to permit unrestricted passage of oil directly to said packing; a follower surrounding the rod and threadedly received into said oil chamber counterbore to close said chamber and force said gland against said packing; and means for supplying oil to said oil chamber.

In testimony whereof, we have hereunto set our hands at Los Angeles, California, this 7th day of January, 1924.

WILLIAM L. McLAINE.
WILLARD L. BOROUGH.